(12) United States Patent
Park

(10) Patent No.: US 12,387,702 B2
(45) Date of Patent: Aug. 12, 2025

(54) APPARATUS AND METHOD FOR PROVIDING MUSIC USING VALVE CONTROL

(71) Applicant: HL MANDO CORPORATION, Gyeonggi-do (KR)

(72) Inventor: Byoung Jin Park, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 220 days.

(21) Appl. No.: 18/219,513

(22) Filed: Jul. 7, 2023

(65) Prior Publication Data

US 2024/0169966 A1 May 23, 2024

(30) Foreign Application Priority Data

Nov. 17, 2022 (KR) .................. 10-2022-0154464

(51) Int. Cl.
| | | |
|---|---|---|
| G10K 1/068 | (2006.01) | |
| B60T 13/66 | (2006.01) | |
| B60T 17/22 | (2006.01) | |
| G10H 1/00 | (2006.01) | |
| G10H 1/02 | (2006.01) | |
| G10H 1/40 | (2006.01) | |

(52) U.S. Cl.
CPC ............ *G10K 1/068* (2013.01); *B60T 13/662* (2013.01); *B60T 17/22* (2013.01); *G10H 1/0008* (2013.01); *G10H 1/02* (2013.01); *G10H 1/40* (2013.01)

(58) Field of Classification Search
CPC ....... G10K 1/068; B60T 13/662; B60T 17/22; G10H 1/008; G10H 1/40; H10H 1/02
See application file for complete search history.

(56) References Cited

U.S. PATENT DOCUMENTS

| 1,676,346 A | * | 7/1928 | Nocito | ................... G10K 1/068 116/151 |
| 2024/0169966 A1 | * | 5/2024 | Park | ....................... G10K 1/068 |

* cited by examiner

*Primary Examiner* — Robert W Horn
(74) *Attorney, Agent, or Firm* — WOMBLE BOND DICKINSON (US) LLP

(57) ABSTRACT

An apparatus and method for providing music using valve control are disclosed. The apparatus for providing music using valve control according to an embodiment of the present disclosure includes a plurality of valves installed in a vehicle and generating sound when opening and closing the plurality of valves; and a controller installed in the vehicle and configured to control opening and closing of the plurality of valves; wherein the controller may determine whether at least some of the plurality of valves fall under a free opening and closing condition, and generate sound by opening and closing one or more valves falling under the free opening and closing condition when at least some of the plurality of valves fall under the free opening and closing condition.

20 Claims, 3 Drawing Sheets

APPARATUS AND METHOD FOR PROVIDING MUSIC USING VALVE CONTROL

CROSS-REFERENCE TO RELATED APPLICATION

This application claims priority to and the benefit of Korean Patent Applications No. 10-2022-0154464, filed on Nov. 17, 2022, the disclosure of which is incorporated herein by reference in its entirety.

BACKGROUND

1. Technical Field

The present disclosure relates to an apparatus and method for providing music using valve control, and more particularly, to an apparatus and method for providing music using open/close control of a valve installed in a vehicle.

2. Discussion of Related Art

A number of valves are installed in a vehicle. In addition, the valve may generate a specific sound when opening and closing. In the case of a conventional internal combustion engine vehicle, it is difficult for a driver to recognize the sound generated when a valve installed in the vehicle is opened or closed due to noise generated by an engine or the like. However, in the case of an electric vehicle not equipped with an engine, almost no noise is generated from the vehicle during operation, so the driver can recognize the sound generated when various valves installed in the vehicle are opened and closed.

Therefore, there is a possibility of providing the driver with sound, that is, music with rules, by using valve opening/closing control. However, prior art approaching the opening/closing control of valves installed in a vehicle from such a viewpoint has not yet been found.

SUMMARY

The present disclosure is directed to providing an apparatus and method for providing music using valve control, which can provide a sound having a rule, that is, music, to a driver using opening and closing control of a valve installed in a vehicle.

The objects of the present disclosure are not limited to the above-described objects, and other objects that are not mentioned will be able to be clearly understood by those skilled in the art to which the present disclosure pertains from the following description.

According to an aspect of the present disclosure, provided is an apparatus for providing music using valve control, the apparatus including a plurality of valves installed in a vehicle and generating sound when opening and closing the plurality of valves; and a controller installed in the vehicle and configured to control opening and closing of the plurality of valves; wherein the controller determines whether at least some of the plurality of valves fall under a free opening and closing condition, and generates sound by opening and closing one or more valves falling under the free opening and closing condition when at least some of the plurality of valves fall under the free opening and closing condition.

In the apparatus for providing music using valve control, the controller may generate a beat by controlling a time of opening and closing one or more valves falling under the free opening and closing condition.

In the apparatus for providing music using valve control, at least some of the plurality of valves may generate sounds of different pitches when opening and closing.

In the apparatus for providing music using valve control, when two or more valves generating sounds of different pitches among the plurality of valves fall under the free opening and closing condition, the controller may generate a melody by controlling an opening and closing sequence of the two or more valves.

In the apparatus for providing music using valve control, the valve may be an outlet valve disposed corresponding to a wheel of the vehicle and disposed in a hydraulic circuit through which hydraulic pressure is discharged from a brake of the wheel.

In the apparatus for providing music using valve control, the free opening and closing condition may be a case where the wheel corresponding to the valve is in an uncontrolled state while a traction control for independently controlling the braking hydraulic pressure of the plurality of wheels of the vehicle for each wheel is performed.

In the apparatus for providing music using valve control, when the wheel is in the uncontrolled state, the brake of the wheel may be not supplied with braking hydraulic pressure.

In the apparatus for providing music using valve control, when the wheel is in the uncontrolled state, the brake of the wheel may maintain a state in which hydraulic pressure is discharged.

In the apparatus for providing music using valve control, the plurality of valves may include a first valve disposed corresponding to a front left wheel of the vehicle, a second valve disposed corresponding to a rear right wheel of the vehicle, a third valve disposed corresponding to a rear left wheel of the vehicle, and a fourth valve disposed corresponding to a front right wheel of the vehicle.

In the apparatus for providing music using valve control, the first to fourth valves may generate sounds of different pitches each other when opening and closing.

According to another aspect of the present disclosure, provided is a method for providing music using valve control, the method including determining, by a controller installed in a vehicle, whether at least some of a plurality of valves installed in the vehicle and generating sound when opening and closing fall under a free opening and closing condition; and generating, by the controller, sound by opening and closing one or more valves falling under the free opening and closing condition when at least some of the plurality of valves fall under the free opening and closing condition.

In the method for providing music using valve control, the controller may generate a beat by controlling a time of opening and closing one or more valves falling under the free opening and closing condition.

In the method for providing music using valve control, at least some of the plurality of valves may generate sounds of different pitches when opening and closing.

In the method for providing music using valve control, when two or more valves generating sounds of different pitches among the plurality of valves fall under the free opening and closing condition, the controller may generate a melody by controlling an opening and closing sequence of the two or more valves.

In the method for providing music using valve control, the valve may be an outlet valve disposed corresponding to a wheel of the vehicle and disposed in a hydraulic circuit through which hydraulic pressure is discharged from a brake of the wheel.

In the method for providing music using valve control, the free opening and closing condition may be a case where the wheel corresponding to the valve is in an uncontrolled state while a traction control for independently controlling the braking hydraulic pressure of the plurality of wheels of the vehicle for each wheel is performed.

In the method for providing music using valve control, when the wheel is in the uncontrolled state, the brake of the wheel may be not supplied with braking hydraulic pressure.

In the method for providing music using valve control, when the wheel is in the uncontrolled state, the brake of the wheel may maintain a state in which hydraulic pressure is discharged.

In the method for providing music using valve control, the generating, by the controller, sound by opening and closing one or more valves falling under the free opening and closing condition may include receiving, by the controller, a sound generation rule previously stored; and opening and closing one or more valves falling under the free opening and closing condition according to the sound generation rule.

In the method for providing music using valve control, the plurality of valves may include a first valve disposed corresponding to a front left wheel of the vehicle, a second valve disposed corresponding to a rear right wheel of the vehicle, a third valve disposed corresponding to a rear left wheel of the vehicle, and a fourth valve disposed corresponding to a front right wheel of the vehicle.

In the method for providing music using valve control, the first to fourth valves may generate sounds of different pitches each other when opening and closing.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
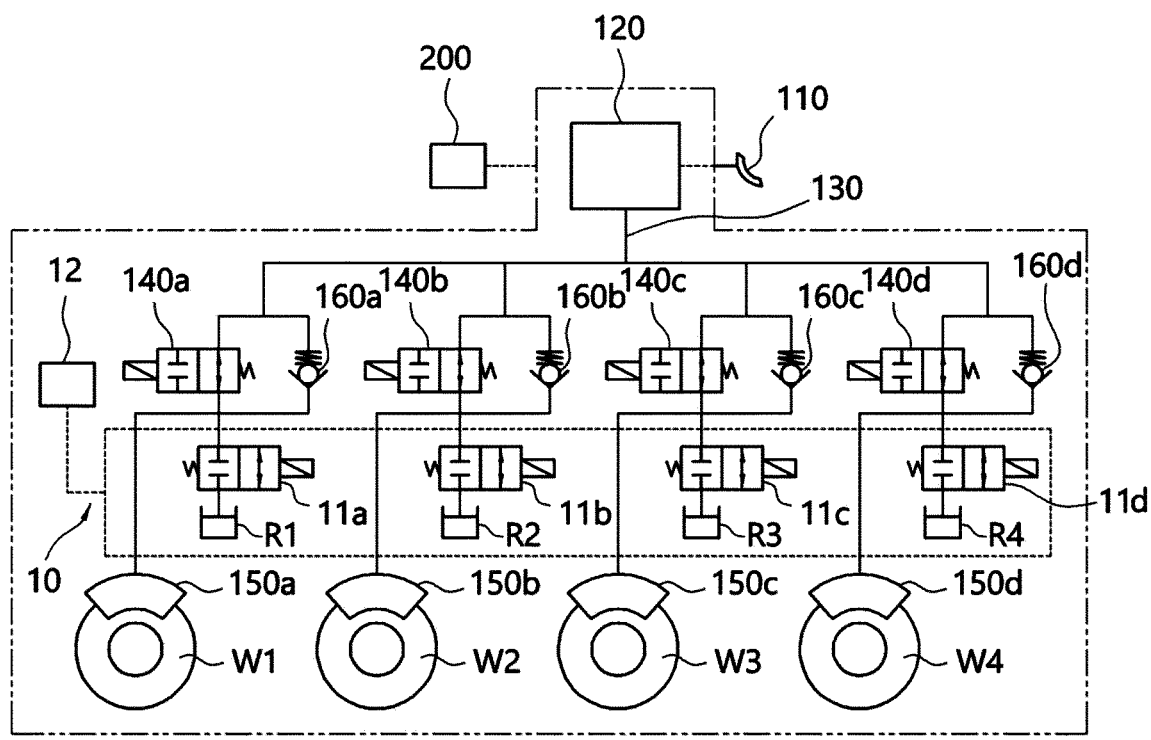
FIG. 1 is a diagram illustrating a configuration of an apparatus for providing music using valve control according to an embodiment of the present disclosure.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their invention.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

FIG. 1 is a diagram illustrating a configuration of an apparatus for providing music using valve control according to an embodiment of the present disclosure.

The apparatus 10 for providing music using valve control according to an embodiment of the present disclosure provides music by controlling opening and closing of a valve installed in a vehicle so that a sound generated when the valve is opened and closed has at least one of a beat and a pitch. In the present disclosure, music means sound with rules and can be used in a broad sense even including regular noises.

Referring to FIG. 1, an apparatus 10 for providing music using valve control according to an embodiment of the present disclosure includes a plurality of valves 11a, 11b, 11c, and 11d and a controller 12.

Two or more of the plurality of valves 11a, 11b, 11c, and 11d are installed in the vehicle and generate a sound when the valve is opened and closed. At least some of the plurality of valves 11a, 11b, 11c, and 11d may generate sounds of different pitches when opening and closing. The sound generated when the individual valves 11a, 11b, 11c, and 11d are opened and closed has a specific pitch, and the time (or period) at which the valve is opened and closed may form a beat.

The apparatus 10 for providing music using valve control according to an embodiment of the present disclosure may be installed in association with a brake traction control system (BTCS) implementing a traction control system (TCS), by independently controlling a speed of each wheel W1, W2, W3, and W4 of the vehicle through adjustment of brake pressure.

The BTCS includes a hydraulic pressure generator 120, a hydraulic circuit 130 configured to transmit the hydraulic pressure generated by the hydraulic pressure generator 120 to brakes 150a, 150b, 150c, and 150d disposed corresponding to each of wheels W1, W2, W3, and W4 of the vehicle in one-to-one manners, and inlet valves 140a, 140b, 140c, and 140d disposed on the hydraulic pressure circuit 130 corresponding to each of the brakes 150a, 150b, 150c, and 150d in one-to-one manners and opened so that the hydraulic pressure may be transmitted to each of the brakes 150a, 150b, 150c, and 150d when the brake is performed. In this case, the hydraulic pressure generator 120 may include a pump or the like for generating hydraulic pressure. In addition, the hydraulic pressure generator 120 may be connected to a brake pedal 110 to generate a braking hydraulic pressure according to operation of the brake pedal 110 of a driver. In addition, the brakes 150a, 150b, 150c, and 150d may include a disk rotating together with the wheels, a pad for pressing the disk by hydraulic pressure on opposite sides thereof, a caliper having a piston or the like for advancing and retracting the pad, and the like.

In the BTCS, the plurality of valves 11a, 11b, 11c, and 11d are disposed corresponding to the wheels W1, W2, W3, and W4 of the vehicle, and may be outlet valves disposed on the hydraulic circuit 130 so that hydraulic pressure can be discharged from the brakes 150a, 150b, 150c, and 150d of the wheels W1, W2, W3, and W4. The plurality of valves 11a, 11b, 11c, and 11d are controlled to be closed to form a pressure of the brake when braking, and are opened to decompress the brake when braking is released. In this regard, on the hydraulic circuit 130, reservoirs R1, R2, R3, and R4 may be disposed corresponding to the plurality of valves 11a, 11b, 11c, and 11d to accommodate a hydraulic pressure discharged from the brake when the plurality of valves 11a, 11b, 11c, and 11d are opened.

In more detail, the plurality of valves 11a, 11b, 11c, and 11d may include a first valve 11a disposed corresponding to a front left wheel W1 of the vehicle, a second valve 11b disposed corresponding to a rear right wheel W2 of the vehicle, a third valve 11c disposed corresponding to a rear left wheel W3 of the vehicle, and a fourth valve 11d disposed corresponding to a front right wheel W4 of the vehicle. In this case, the first to fourth valves 11a, 11b, 11c, and 11d may generate sounds of different pitches each other when opening and closing.

Meanwhile, a plurality of check valves 160a, 160b, 160c, and 160d for preventing a backflow of the hydraulic pressure may be disposed in the hydraulic circuit 130. The plurality of check valves 160a, 160b, 160c, and 160d prevents a backflow of the hydraulic pressure when braking or braking is released, thereby allowing the hydraulic pressure to be stably supplied or released.

In a situation in which the BTCS is not operated during driving of the vehicle, when the driver presses the brake pedal 110, the hydraulic pressure generator 120 generates a hydraulic pressure corresponding to the pedal effort. In addition, the inlet valves 140a, 140b, 140c, and 140d are opened, and the plurality of valves 11a, 11b, 11c, and 11d are closed, so that the hydraulic pressure generated by the hydraulic pressure generator 120 is transmitted to the brakes 150a, 150b, 150c, and 150d via the hydraulic circuit 130. Accordingly, braking of the vehicle is performed.

Meanwhile, when a slip exceeding a preset reference slip rate occurs during driving of the vehicle, the BTCS operates, and a BTCS controller 200 individually controls the hydraulic pressure supplied to the brake of each wheel by using the variation of the slip and acceleration of the wheel being driven so that the slip of each wheel can be maintained within a preset range of the slip rate. Specifically, the inlet valves 140a, 140b, 140c, and 140d and the plurality of valves 11a, 11b, 11c, and 11d may be individually controlled to increase or decrease the hydraulic pressure supplied to the brakes 150a, 150b, 150c, and 150d of each wheel or adjust the time of the maintained state of the hydraulic pressure. Meanwhile, the BTCS controller 200 may be provided integrally with the controller 12 of the apparatus 10 for providing music using valve control according to an embodiment of the present disclosure.

The controller 12 controls the opening and closing of the plurality of valves 11a, 11b, 11c, and 11d. The controller 12 individually controls the opening and closing of each of the valves 11a, 11b, 11c, and 11d. In more detail, the controller 12 determines whether at least some of the plurality of valves 11a, 11b, 11c, and 11d fall under a free opening and closing condition, and opens and closes one or more valves falling under the free opening and closing condition to generate sound when at least some of the plurality of valves 11a, 11b, 11c, and 11d fall under the free opening and closing condition.

When two or more valves generating sounds of different pitches among the plurality of valves 11a, 11b, 11c, and 11d fall under the free opening and closing condition, the controller 12 may generate a melody by controlling the opening and closing sequence of the corresponding two or more valves. In addition, the controller 12 may generate a beat by controlling the time (or period) of opening and closing one or more valves falling under the free opening and closing condition. Under the control of the controller 12, the plurality of valves falling under the free opening and closing condition may generate sounds having pitches and beats, that is, music. Through this, the driver of the vehicle can be provided with a pleasant experience while driving the vehicle.

In an embodiment of the present disclosure, when a sound is generated by opening and closing one or more valves falling under the free opening and closing condition, the controller 12 may receive a sound generation rule stored in advance and may open and close one or more valves falling under the free opening and closing condition according to the sound generation rule. In this case, the provision of the sound generation rule may mean that the controller 12 searches for a previously stored sheet music. The sheet music may include a musical note and one or more beats corresponding to the sound generated when each valve is opened and closed.

As described above, the apparatus 10 for providing music using valve control according to an embodiment of the present disclosure may be installed in association with the BTCS. In this case, the free opening and closing condition may be a case where the wheel corresponding to the valve is in an uncontrolled state while a traction control for independently controlling the braking hydraulic pressure of the plurality of wheels W1, W2, W3, and W4 of the vehicle for each wheel is performed. In other words, the free opening and closing condition may be a case where some of the plurality of wheels W1, W2, W3, and W4 become a controlled wheel and the other become an uncontrolled wheel (this case may be referred to as a BTCS split control). In this case, when the wheel is in the uncontrolled state, the brake of the wheel is not supplied with braking hydraulic pressure. In addition, when the wheel is in the uncontrolled state, the brake of the wheel may maintain a state in which hydraulic pressure is discharged.

Figure 2:
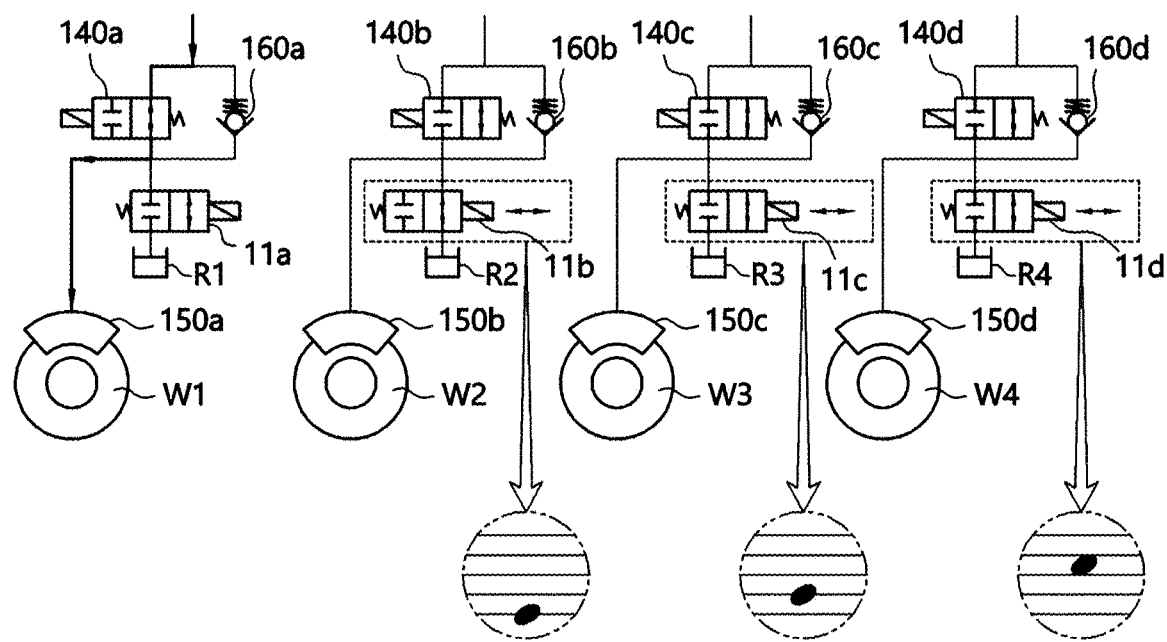
FIG. 2 is a diagram illustrating an operation of an apparatus for providing music using valve control according to an embodiment of the present disclosure.

FIG. 2 illustrates an operation of an apparatus for providing music using valve control according to an embodiment of the present disclosure.

Referring to FIG. 2, as described above, the wheel W1 corresponding to the first valve 11a of the plurality of valves 11a, 11b, 11c, and 11d is a controlled wheel and is in a state in which hydraulic pressure for braking is supplied to the brake 150a. Therefore, the corresponding first inlet valve 140a is opened, the first valve 11a is closed, and the first valve 11a does not satisfy the free opening and closing condition. In comparison, the three wheels W2, W3, and W4 corresponding to the second to fourth valves 11b, 11c, and 11d are uncontrolled wheels and are in a state in which hydraulic pressure for braking is not supplied to the corresponding respective brakes 150b, 150c, and 150d. Therefore, the corresponding second to fourth inlet valves 140b, 140c, and 140d are closed, the second to fourth valves 11b, 11c, and 11d are opened, and the second to fourth valves 11b, 11c, and 11d satisfy the free opening and closing condition (split control of BTCS). In this situation, the controller 12 may control the opening and closing of the second to fourth valves 11b, 11c, and 11d satisfying the free opening and closing condition to generate music using sounds generated when the second to fourth valves 11b, 11c, and 11d are opened and closed.

Figure 3:
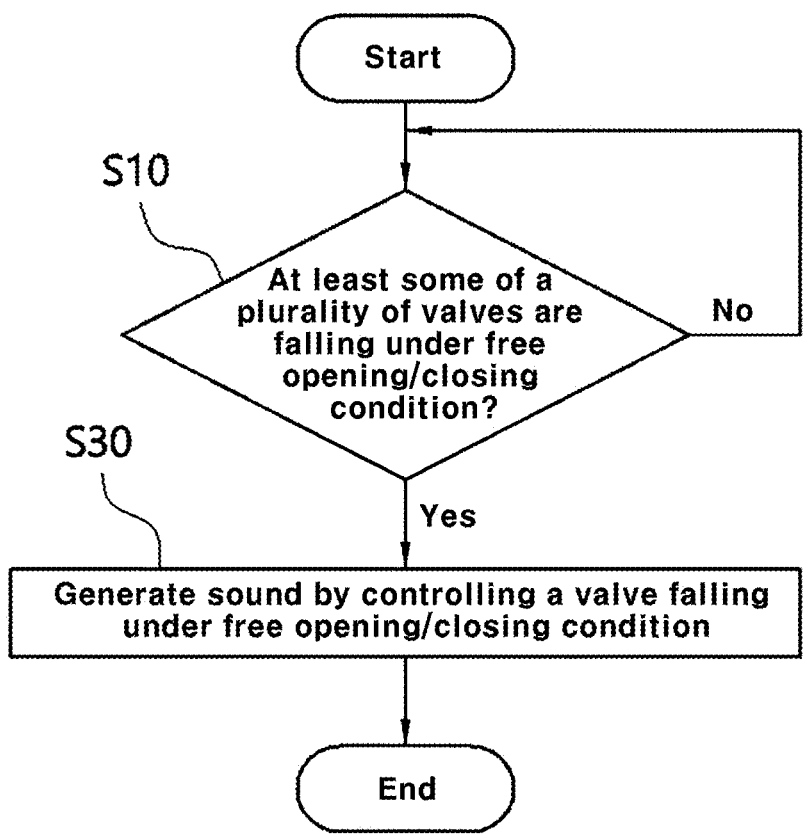
FIG. 3 is a flowchart of a method for providing music using valve control according to an embodiment of the present disclosure.

FIG. 3 is a flowchart of a method for providing music using valve control according to an embodiment of the present disclosure.

The method for providing music using valve control according to an embodiment of the present disclosure may be performed through the above-described apparatus 10 for providing music using valve control. The method for providing music using valve control according to an embodiment of the present disclosure will be described in detail with reference to FIG. 3.

First, the controller 12 installed in the vehicle determines whether at least some of the plurality of valves 11a, 11b, 11c, and 11d that are installed in the vehicle and generate sound when opening and closing fall under a free opening and closing condition at step S10. In this case, at least some of the plurality of valves 11a, 11b, 11c, and 11d may generate sounds of different pitches when opening and closing.

As discussed with respect to the apparatus 10 for providing music using valve control according to an embodiment of the present disclosure, the plurality of valves 11a, 11b, 11c, and 11d may be outlet valves disposed corresponding to the wheel of the vehicle and disposed in a hydraulic circuit through which hydraulic pressure is discharged from the brake of the wheel.

In more detail, the plurality of valves 11a, 11b, 11c, and 11d may include a first valve 11a disposed corresponding to a front left wheel of the vehicle, a second valve 11b disposed corresponding to a rear right wheel of the vehicle, a third valve 11c disposed corresponding to a rear left wheel of the vehicle, and a fourth valve 11d disposed corresponding to a front right wheel of the vehicle. In this case, the first to fourth valves may generate sounds of different pitches each other when opening and closing.

Next, when at least some of the plurality of valves 11a, 11b, 11c, and 11d fall under the free opening and closing condition, the controller 12 opens and closes one or more valves falling under the free opening and closing condition to generate sounds at step S30. The controller 12 may generate a beat by controlling the time of opening and closing one or more valves falling under the free opening and closing condition. In addition, when two or more valves generating sounds of different pitches among the plurality of valves fall under the free opening and closing condition, the controller 12 may generate a melody by controlling the opening and closing sequence of the two or more valves.

In this case, the free opening and closing condition may be a case where the wheel corresponding to the valve is in an uncontrolled state while a traction control for independently controlling the braking hydraulic pressure of the plurality of wheels of the vehicle for each wheel is performed. In this case, when the wheel is in the uncontrolled state, the brake of the wheel may not be supplied with braking hydraulic pressure. In addition, when the wheel is in the uncontrolled state, the brake of the wheel may maintain a state in which hydraulic pressure is discharged.

Figure 4:
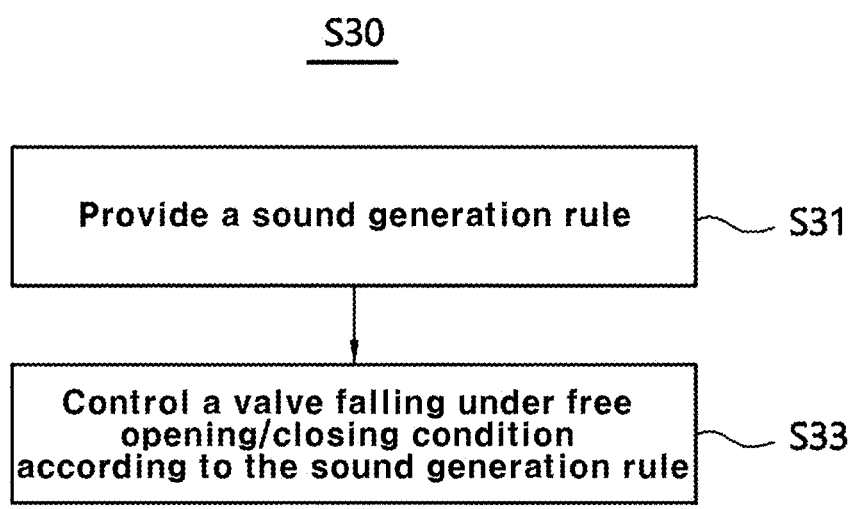
FIG. 4 is a detailed flowchart of a step of generating a sound of a method for providing music using valve control according to an embodiment of the present disclosure.

FIG. 4 is a detailed flowchart of a step of generating a sound of a method for providing music using valve control according to an embodiment of the present disclosure. A step S30 of generating sound will be looked at in detail with reference to FIG. 4.

First, the controller 12 receives a pre-stored sound generation rule at step S31. For example, the controller 12 may search for a pre-stored sheet music. In this case, the sheet music may include a musical note and one or more beats corresponding to the sound generated when each valve is opened and closed.

Next, the controller 12 opens and closes one or more valves falling under the free opening and closing condition according to the sound generation rule. That is, the controller 12 may open and close one or more valves falling under the free opening and closing condition so that music corresponding to the sheet music is generated.

Meanwhile, matters described in relation to the apparatus 10 for providing music using valve control may be applied as they are to the method for providing music using valve control according to an embodiment of the present disclosure.

According to the above configuration, the apparatus and method for providing music using valve control according to the present disclosure provide music to a driver through a configuration in which a valve falling under a free opening and closing condition among valves installed in a vehicle is opened and closed according to a predetermined rule, thereby improving a quality of emotion of the vehicle.

It should be understood that the effects of the present disclosure are not limited to the above-described effects, and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. An apparatus for providing music using valve control, the apparatus comprising:
   a plurality of valves installed in a vehicle and generating sound when opening and closing the plurality of valves; and
   a controller installed in the vehicle and configured to control opening and closing of the plurality of valves;
   wherein the controller determines whether at least some of the plurality of valves fall under a free opening and closing condition, and generates sound by opening and closing one or more valves falling under the free opening and closing condition when at least some of the plurality of valves fall under the free opening and closing condition.

2. The apparatus for providing music using valve control of claim 1, wherein the controller generates a beat by controlling a time of opening and closing one or more valves falling under the free opening and closing condition.

3. The apparatus for providing music using valve control of claim 1, wherein at least some of the plurality of valves generate sounds of different pitches when opening and closing.

4. The apparatus for providing music using valve control of claim 3, wherein when two or more valves generating sounds of different pitches among the plurality of valves fall under the free opening and closing condition, the controller generates a melody by controlling an opening and closing sequence of the two or more valves.

5. The apparatus for providing music using valve control of claim 1, wherein the valve is an outlet valve disposed corresponding to a wheel of the vehicle and disposed in a hydraulic circuit through which hydraulic pressure is discharged from a brake of the wheel.

6. The apparatus for providing music using valve control of claim 5, wherein the free opening and closing condition is a case where the wheel corresponding to the valve is in an uncontrolled state while a traction control for independently controlling the braking hydraulic pressure of the plurality of wheels of the vehicle for each wheel is performed.

7. The apparatus for providing music using valve control of claim 6, wherein when the wheel is in the uncontrolled state, the brake of the wheel is not supplied with braking hydraulic pressure.

8. The apparatus for providing music using valve control of claim 6, wherein when the wheel is in the uncontrolled state, the brake of the wheel maintains a state in which hydraulic pressure is discharged.

9. The apparatus for providing music using valve control of claim 5, the plurality of valves comprise a first valve disposed corresponding to a front left wheel of the vehicle, a second valve disposed corresponding to a rear right wheel of the vehicle, a third valve disposed corresponding to a rear left wheel of the vehicle, and a fourth valve disposed corresponding to a front right wheel of the vehicle.

10. The apparatus for providing music using valve control of claim 9, wherein the first to fourth valves generate sounds of different pitches each other when opening and closing.

11. A method for providing music using valve control, the method comprising:
    determining, by a controller installed in a vehicle, whether at least some of a plurality of valves installed in the vehicle and generating sound when opening and closing fall under a free opening and closing condition; and
    generating, by the controller, sound by opening and closing one or more valves falling under the free opening and closing condition when at least some of the plurality of valves fall under the free opening and closing condition.

12. The method for providing music using valve control of claim 11, wherein the controller generates a beat by controlling a time of opening and closing one or more valves falling under the free opening and closing condition.

13. The method for providing music using valve control of claim 11, wherein at least some of the plurality of valves generate sounds of different pitches when opening and closing.

14. The method for providing music using valve control of claim 13, wherein when two or more valves generating sounds of different pitches among the plurality of valves fall under the free opening and closing condition, the controller generates a melody by controlling an opening and closing sequence of the two or more valves.

15. The method for providing music using valve control of claim 11, wherein the valve is an outlet valve disposed corresponding to a wheel of the vehicle and disposed in a hydraulic circuit through which hydraulic pressure is discharged from a brake of the wheel.

16. The method for providing music using valve control of claim 15, wherein the free opening and closing condition is a case where the wheel corresponding to the valve is in an uncontrolled state while a traction control for independently controlling the braking hydraulic pressure of the plurality of wheels of the vehicle for each wheel is performed.

17. The method for providing music using valve control of claim 16, wherein when the wheel is in the uncontrolled state, the brake of the wheel is not supplied with braking hydraulic pressure.

18. The method for providing music using valve control of claim 16, wherein when the wheel is in the uncontrolled state, the brake of the wheel maintains a state in which hydraulic pressure is discharged.

19. The method for providing music using valve control of claim 11, wherein the generating, by the controller, sound by opening and closing one or more valves falling under the free opening and closing condition comprises:
    receiving, by the controller, a sound generation rule previously stored; and
    opening and closing one or more valves falling under the free opening and closing condition according to the sound generation rule.

20. The method for providing music using valve control of claim 15, the plurality of valves comprise a first valve disposed corresponding to a front left wheel of the vehicle, a second valve disposed corresponding to a rear right wheel of the vehicle, a third valve disposed corresponding to a rear left wheel of the vehicle, and a fourth valve disposed corresponding to a front right wheel of the vehicle.

* * * * *